United States Patent [19]

Conner

[11] Patent Number: 4,500,174

[45] Date of Patent: Feb. 19, 1985

[54] ELECTROCHROMIC IMAGING APPARATUS

[76] Inventor: Bruce E. Conner, 510 Catherine St., Ann Arbor, Mich. 48104

[21] Appl. No.: 455,742

[22] Filed: Jan. 5, 1983

[51] Int. Cl.³ .............................................. G02F 1/25
[52] U.S. Cl. ..................... 350/357; 350/354
[58] Field of Search ...................... 350/354, 355, 357

[56] References Cited

U.S. PATENT DOCUMENTS

| | | | |
|---|---|---|---|
| 3,578,843 | 5/1971 | Castellion | 350/160 |
| 3,712,710 | 1/1973 | Castellion et al. | 350/160 |
| 3,807,832 | 4/1974 | Castellion | 350/160 |
| 3,844,636 | 10/1974 | Maricle et al. | 350/160 |
| 4,120,568 | 10/1978 | Deb et al. | 350/160 |
| 4,170,406 | 10/1979 | Giglia et al. | 350/357 |
| 4,184,751 | 1/1980 | Nicholson | 350/357 |
| 4,191,453 | 3/1980 | Beni et al. | 350/357 |
| 4,201,454 | 5/1980 | Beni et al. | 350/357 |
| 4,231,641 | 11/1980 | Randin | 350/357 |
| 4,258,984 | 3/1981 | Beni et al. | 350/357 |
| 4,272,163 | 6/1981 | Samokhin et al. | 350/357 |
| 4,272,164 | 6/1981 | Trussel, Jr. | 350/357 |
| 4,294,520 | 10/1981 | Inoue et al. | 350/357 |
| 4,300,138 | 11/1981 | Nakauchi et al. | 340/785 |
| 4,306,774 | 12/1981 | Nicholson | 350/357 |
| 4,338,000 | 7/1982 | Kamimori et al. | 350/357 |
| 4,340,278 | 7/1982 | Beni et al. | 350/357 |

OTHER PUBLICATIONS

G. Beni & J. L. Shay, "Electrochromism of Heat--Treated Anodic Iridium Oxide Films in Acidic, Neutral, and Alkaline Solutions", Applied Phys. Lett., 33(7), 1 Oct. 1978, pp. 567-568.

S. Gottesfeld & J. D. E. McIntyre, "Electrochromism in Anodic Iridium Oxide Films", Appl. Phys. Lett., 33(2), 15 Jul. 1978, pp. 208-213.

J. Grinberg, et al., "A New Real-Time Non-Coherent to Coherent Light Image Converter the Hybrid Field Effect Liquid Crystal Light Valve", Optical Engineering, vol. 14, No. 3, May-Jun. 1975, pp. 217-225.

*Primary Examiner*—Bruce Y. Arnold
*Attorney, Agent, or Firm*—Basile, Weintraub & Hanlon

[57] ABSTRACT

An electrochromic imaging apparatus utilizing electrochromic iridium oxide and a thin-film solid ionic conductor. In a transmissive cell, a first electrode, a photoconductive material layer, an electrochromic iridium oxide layer, an ionic conductive material layer and a second electrode are successively disposed on a substrate. The electrochromic iridium oxide exhibits coloration when an electric field of one polarity is applied across the first and second electrodes to record an image which is incident upon the substrate. Reversal of the polarity of the electric field across the first and second electrode causes bleaching of the electrochromic iridium oxide. In a reflective cell, a light blocking layer having a reflective surface is disposed between the photoconductive material layer and the electrochromic iridium oxide to optically separate a viewing light incident upon the second electrode from the image incident on the substrate. In a reflective cell having two separate memories, an electrically insulating, optically transparent material layer is interposed between a transmissive cell and a reflective cell. A light source projects the image formed in the electrochromic iridium oxide layer in the transmissive cell through the electrically insulating layer to the reflective cell in which the image is formed in the second electrochromic material layer. The image on the second electrochromic material layer is viewed independently from the image in the first transmissive cell.

11 Claims, 3 Drawing Figures

ELECTROCHROMIC IMAGING APPARATUS

BACKGROUND OF THE INVENTION

1. Field of the Invention

This invention relates, in general, to electro-optical devices and, more specifically, to electro-optical devices utilizing electrochromic materials.

2. Description of the Prior Art

Electrically controllable display devices are widely used as data displays for watches, computers, etc. Typically, these displays include liquid crystal displays, light emitting diode displays, plasma displays, etc.

Liquid crystal displays suffer from the disadvantages of operation over a limited temperature range, substantially no memory and a limited angle of visibility. Light emitting diodes and plasma displays are active devices which require substantial amounts of power and, like the liquid crystal displays, exhibit no memory when power is removed.

Electrochromic devices have been investigated since they afford the significant advantages of memory and reduced power consumption over other types of displays. Such electrochromic devices employ an electrochromic material which is responsive to the application of an electrical field of a given polarity so that the material undergoes a change from a first persistent state in which it is essentially non-absorptive of electromagnetic radiation, that is, it is transparent or bleached, to a second persistent state in which it absorbs electromagnetic radiation and darkens or changes to a colored state, typically dark blue.

In constructing such electrochromic devices, a layer of electrochromic material is disposed, along with an electrolyte or ionic conductive material layer, between two electrodes across which a reversible electric field is applied. When a potential difference of one polarity is applied to the two electrodes, the light absorptive characteristics of the electrochromic layer are altered so that it switches from a clear or bleached state to a darkened state. Reversal of the electric field across the electrodes causes the electrochromic material to revert back to a clear state.

Electrochromic behavior has been noted in a variety of materials, such as the oxides, sulfides and other compounds of transition elements. Extensive use of tungsten oxide ($WO_3$) has been made in electrochromic devices. However, tungsten oxide while providing long term memory still has drawbacks which has limited its use in certain types of electrochromic devices, such as imaging devices. The response time of tungsten oxide, i.e., the switching time from a clear state to a darkened state and vice-versa, is extremely slow, typically on the order of several seconds. This effectively prohibits the use of tungsten oxide in display applications requiring high switching speeds.

More importantly, repeated switching of the tungsten oxide between clear and darkened states or use over long storage times results in progressive corrosion or dissolution of the tungsten oxide layer which leads to an eventual failure of the device.

In an effort to overcome the problems encountered with the use of tungsten oxide, iridium oxide ($IrO_2$) has been investigated for use in electrochromic based devices. Iridium oxide exhibits long-term memory and has a significantly faster switching time, on the order of 50 milliseconds. Further, iridium oxide is resistent to corrosion or dissolution over long-term use.

Despite the advantages associated with the use of iridium oxide as an electrochromic material, the development of a viable electrochromic imaging device utilizing iridium oxide has not, until recently, been possible due to difficulties in applying iridium oxide to electrodes. Further, previous efforts have been directed solely at constructing display devices, such as watches, calculators, etc.; not imaging-type devices.

Thus, it would be desirable to provide an electrochromic imaging apparatus using iridium oxide as the electrochromic material which overcomes the problems encountered with previous electrochromic imaging devices. It would also be desirable to provide an electrochromic imaging apparatus using iridium oxide which is usable as a building block or modular component for many different imaging applications. Finally, it would be desirable to provide a electrochromic imaging apparatus using iridium oxide which exhibits fast switching characteristics, long-term memory and extensive useful life.

SUMMARY OF THE INVENTION

A unique electrochromic imaging apparatus exhibiting fast switching times and long term memory characteristics is disclosed for use in a variety of imaging applications. The electrochromic imaging apparatus in a transmissive cell embodiment includes a first electrode, a photoconductive material layer, an electrochromic iridium oxide layer, a layer of an ionic conductor and a second electrode which are disposed on an optically transparent substrate. In a reflective cell embodiment, a light blocking material layer having a reflective surface formed on one side is disposed between the photoconductive material layer and the electrochromic iridium oxide layer to optically separate a viewing light incident on one side of the substrate from a reading light incident on the opposite side of the substrate.

In both the transmissive and reflective cell embodiments, when an electric field of a first polarity is applied across the first and second electrodes, an image incident on the first substrate causes the photoconductive material to conduct current in proportion to the amount of light incident on the photoconductor. The flow of current from the photoconductive material causes portions of the electrochromic iridium oxide to switch to a colored or darkened state corresponding to the light and dark areas of the incident image. In the transmissive cell embodiment, the image formed on the electrochromic iridium oxide layer may be viewed through either side of the cell. In the reflective cell embodiment, the image of the electrochromic iridium oxide layer is reflected off of the reflective surface on the light blocking layer for viewing. Reversal of the electric field applied to the first and second electrodes causes the electrochromic iridium oxide layer to bleach to a clear, non-image containing state.

A reflective cell having two separate memories has also been disclosed which includes an electrically insulating layer inteprosed between a transmissive cell and a reflective cell. Light from a field type light source projects an image stored in the electrochromic iridium oxide layer in the transmissive cell through the electrically insulating layer to the electrochromic material layer in the reflective cell. Various operations, such as negative reversal, contrast variation, density variation, etc., may be performed in the reflective cell without erasing or modifying the image in the transmissive cell.

In all embodiments of the electrochromic imaging apparatus of the present invention, a thin film, solid ionic conductor or electrolyte is used. This enables a complete solid state electrochromic imaging apparatus to be devised which exhibits long useful life without deterioration of the electrochromic material layer through repeated cycles of coloration and bleaching; a problem which has plagued previously devised electrochromic devices. Furthermore, due to the fast switching time and long term memory storage without power drain, the electrochromic imaging apparatus of the present invention is adaptable for many different types of imaging applications, such as high density memory, image intensification, color separation, long term image storage and image processing.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
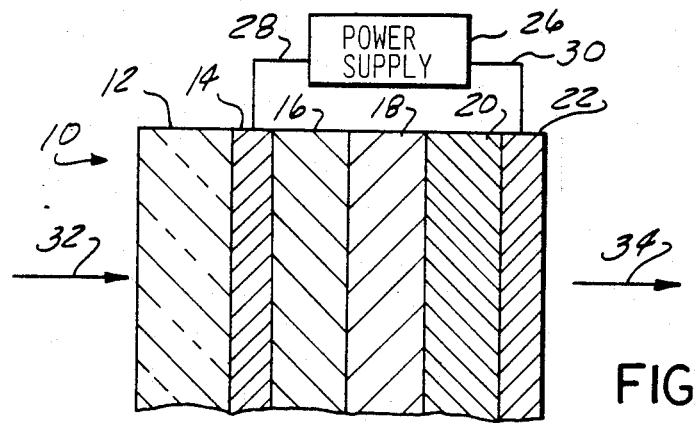
FIG. 1 is a cross-sectional view of the electrochromic imaging apparatus of the present invention constructed as a transmissive cell.

Throughout the following description and drawing, an identical reference number is used to refer to the same component shown in multiple figures of the drawing.

Referring now to the drawing, there is illustrated an electrochromic imaging apparatus utilizing an electrochromic iridium oxide layer and a thin-film, solid ionic conductive material which provides long term image retention.

As shown in FIG. 1, the electrochromic imaging apparatus of the present invention is constructed for use as a transmissive cell 10 in which an image incident on the electrochromic imaging apparatus 10 is formed in the electrochromic iridium oxide layer and stored for viewing. As shown in FIG. 1, the transmissive cell 10 includes a substrate 12. The substrate 12 is formed in a thin layer in any desirable shape, such as square, rectangular, round, etc.

The substrate 12 is formed of an optically transparent material for admitting light therethrough. Preferably, glass as well as transparent plastics may be employed in forming the substrate 12.

The transmissive cell 10 also includes first and second electrodes 14 and 22, respectively; with the first electrode 14 disposed in contact with the substrate 12. The first and second electrodes 14 and 22 are formed of any optically transparent material having at least one electrically conductive surface which exhibits low resistivity and high light transmission characteristics. Any metallic electrical conductor, such as gold, may be employed to form the first and second electrodes 14 and 22, as well as other materials, such as indium oxide, tin oxide and combinations thereof. A preferred electrode is formed of an indium-tin oxide which is deposited on a glass substrate and is known as NESA glass.

A layer 16 of a photoconductive material is disposed in contact with the electrically conductive surface of the first electrode 14. As is well known, photoconductive materials conduct current in areas where light is incident thereon, with such current flow being proportional to the amount of the incident light.

Both organic and inorganic photoconductive materials may be employed, with the particular material being selected depending upon the desired spectral characteristics. By way of example, the photoconductive layer 16 could be formed of selenium (Se), arsenic tri-selenide (AsSe), cadmium sulfide (CdS), zinc sulfide (ZnS) and N-vinyl carbazole with 2,4,7-trinitro-9-flourenone.

The photoconductive layer 16 provides current flow to the adjacent electrochromic iridium oxide layer 18 which induces a change or modulation in the electrochromic iridium layer 18 between bleached and colored states, as will be described in greater detail hereafter.

The photoconductive layer 16 is applied to one side of the first electrode 14 by any conventional technique, such as by vacuum deposition, electron beam deposition and various sputtering methods, so as to provide intimate contact between these layers.

As described above, the transmissive cell 10 includes an electrochromic material layer 18 formed of iridium oxide ($IrO_2$) which is applied to the photoconductive layer 16 by any suitable means, such as by sputtering, vacuum evaporation and electron beam evaporation.

As is well known, iridium oxide is an inorganic solid substance containing one element of variable oxidation state. Iridium oxide exhibits electrochromic characteristics under varying electric fields by switching from a bleached or substantially clear state to a colored or darkened state. Due to the current flow from the photoconductive layer 16, various portions of the electrochromic iridium oxide layer 18 will darken to correspond to the light areas of the image 32 incident on the first substrate 12, as shown in FIG. 1. Reversal of the polarity of the electric field applied across the electrochromic iridium oxide layer 18 causes current flow through the iridium oxide layer 18 back to the first substrate 12 which results in a bleaching of the electrochromic iridium oxide layer 18 to a clear or transparent state.

In order to provide the ions which are required to cause the electrochromic material layer 18 to color, an ionic conductive material layer 20 is disposed in intimate contact with the electrochromic iridium oxide layer 18. This contact may be obtained through vacuum deposition, sputtering, etc. According to the preferred embodiment of the present invention, the ionic conductive layer 20 is formed of a thin-film, solid material which provides mobile ions. Preferably, fluorine compounds, cyanide compounds, aluminum fluoride, lithium fluoride and lead fluoride may be used to form the ionic conductive layer 20.

The ionic conductive layer 20, although not completely understood, apparently functions to provide a reversible ion injection into and out of the iridium oxide layer 18 which forms color centers in the iridium oxide layer. The application of an electric field across the first and second electrodes 14 and 22 results in ion injection into the iridium oxide layer 18 causing it to switch to a colored or darkened state; while a field of an opposite polarity applied across the first and second electrodes 14 and 22 causes ions to flow out of the iridium oxide layer 18 into the ionic conductive layer 20 which results in a bleaching of the iridium oxide layer 18.

In order to store an image on the iridium oxide layer 18 in the transmissive cell 10 shown in FIG. 1, a power supply 26 is connected by means of leads 28 and 30 to the first and second electrodes 14 and 22, respectively. The power supply 26 may be of any conventional design and, preferably, is operative to provide low level D.C. voltage, typically on the order of 1-5 volts to the electrodes 14 and 22. A switch, not shown, is connected to the power supply 26 for reversing the polarity of the voltage applied to the electrodes 14 and 22 to thereby provide for selectible coloration and bleaching of the iridium oxide layer 18.

In operation, when the power supply 26 is switched to provide an electric field of a first polarity across the first and second electrodes 14 and 22, an input image 32 incident on the first substrate 12 causes current flow from the photoconductive layer 16 to the iridium oxide layer 18 which will then darken in areas corresponding to the light areas of the input image 32. This image formed in the iridium oxide layer 18 may be viewed, as shown by arrow 34 in FIG. 1, through the second electrode 22. Further, the image is stored on the iridium oxide layer 18 as long as the electric field is applied across the first and second electrodes 14 and 22 and after the field is completely removed. Reversal of the polarity of the field applied to the first and second electrodes 14 and 22 causes ions to flow out of the iridium oxide layer 18 into the ionic conductor 20. This results in bleaching of the iridium oxide layer 18 and a removal of the image.

Figure 2:
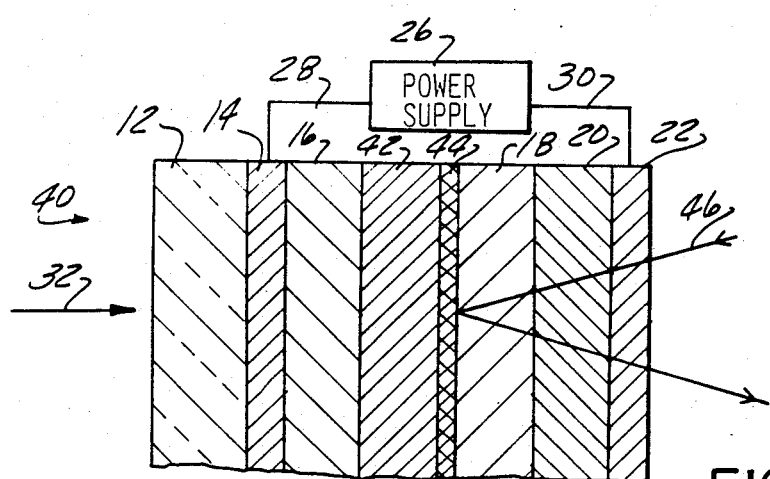
FIG. 2 is a cross-sectional view of the electrochromic imaging apparatus of the present invention constructed as a reflective cell.

Referring now to FIG. 2, the electrochromic imaging apparatus of the present invention may also be constructed as a reflective cell 40. In this embodiment, the reflective cell 40 is constructed substantially identical as the transmissive cell 10 described above and includes a substrate 12, a first electrode 14, a photoconductive material layer 16, an electrochromic iridium oxide layer 18, an ionic conductive layer 20 and a second electrode 24 which are disposed in intimate contact with each other.

However, in order to provide a reflective display, a layer of a light blocking, electric charge permeable material 42 is interposed between the photoconductive layer 16 and the electrochromic iridium oxide layer 20 in contact with the photoconductive layer 16. The light blocking layer, which is preferably comprised of cadmium telluride (CdT) or selenium (Se), permits an electric charge to flow between the photoconductive layer 16 and the iridium oxide layer 18.

The light blocking layer 42 is provided with opposed surfaces, one of which is formed to be optically reflective, such as surface 44 shown in FIG. 2. Although the light blocking layer 42 may be formed with one reflective surface 44, a discrete layer of a reflective material may be disposed in direct contact with the light blocking layer 42. In this embodiment, a thin, reflecting film, such as a multi-layer dielectric mirror or a reflective semiconductor, may be applied in direct contact with one surface of the light blocking layer 42, such as by vapor evaporation, electrodeposition, etc.

In operation, an image 32 incident upon the first substrate 12 will cause the photoconductive layer 16 to conduct in those areas corresponding to the highest light intensity. The current is conducted through the light blocking layer 42 and causes the electrochromic layer 18 to darken out in those areas corresponding to the light portions of the input image 32. However, the input image 32 is prevented from impinging upon the electrochromic iridium oxide layer 18 by the light blocking layer 42. A viewing light 46 from a second light source located in proximity with the second electrode 22 may be reflected off of the reflective surface 44 through the electrochromic iridium oxide layer 18 to enable viewing of the image formed in the iridium oxide layer 18. The application of an opposite potential across the first and second electrodes 14 and 22 cause the iridium oxide layer 18 to bleach to a clear or transparent state, as with the transmissive cell 10 described above.

Figure 3:
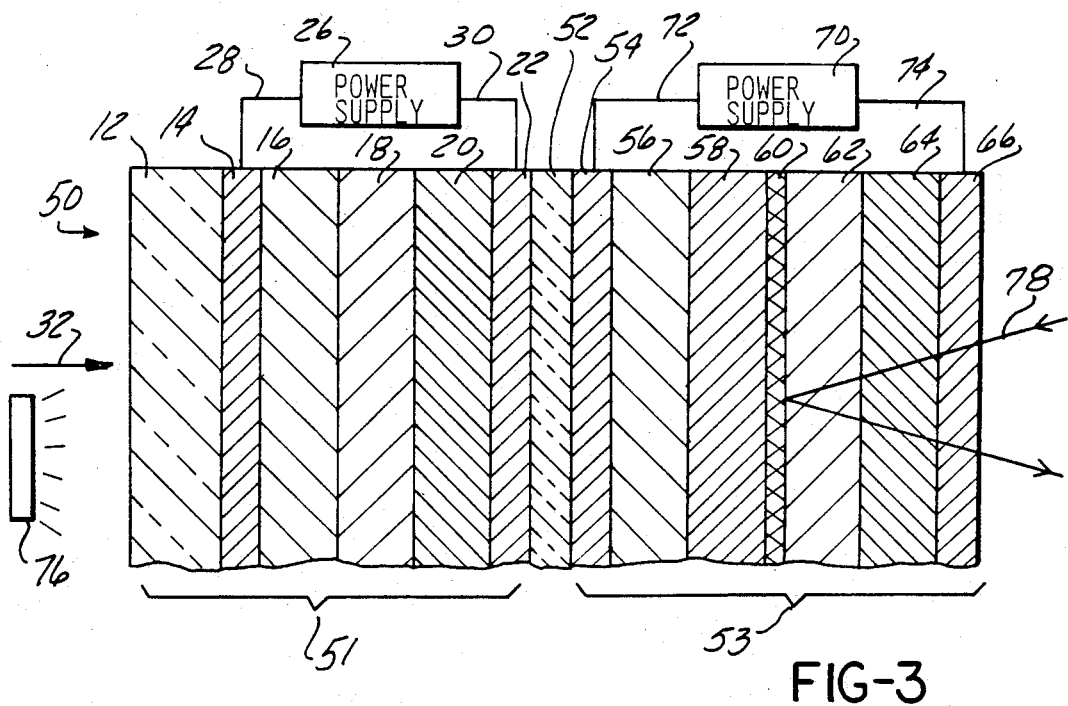
FIG. 3 is a cross-sectional view of the electrochromic imaging apparatus of the present invention constructed as a two-stage imaging apparatus having separate memories.

The transmissive cell 10 and the reflective cell 40 may be combined to form a reflective cell or light valve having two separate memories as shown by reference number 50 in FIG. 3.

The reflective cell 50 shown in FIG. 3 includes a first stage 51 which is constructed in the same manner as the transmissive cell 10 illustrated in FIG. 1. The first stage 51 thus includes a sandwich arrangement of a first substrate 12, a first electrode 14, a photoconductive material layer 16, an electrochromic iridium oxide layer 18, an ionic conductive layer 20 and a second electrode 22 which are formed in the same manner as the corresponding layers in the transmissive cell 10. A power supply 26 is connected by means of leads 28 and 30 to the first and second electrodes 14 and 22 to selectively control the bleaching and coloration of the iridium oxide layer 18.

The reflective cell 50 further includes a second stage 53 which is substantially identical to the reflective cell 40 shown in FIG. 2. The second stage 53 includes a first electrode 54, a photoconductive layer 56, a light blocking layer 58, a reflective surface or layer 60, an electrochromic material layer 62, an ionic conductive layer 64 and a second electrode 66 which are formed of the same materials as are the corresponding material layers of the reflective cell 40. While iridium oxide may be used to form the layer 62, an electrochromic material having a slower switching time, such as tungsten oxide ($WO_3$) may also be employed as the electrochromic material in the second stage 53 of the reflective cell 50 since a fast response or switching is not always required in the second stage 53.

A second power supply 70 is connected by means of leads 72 and 74 to the electrodes 54 and 66. The second power supply 70 controls the selective coloration and bleaching of the second electrochromic material layer 62 in the second stage 53 of the reflective cell 50. Further, the second power supply 70 is operated independently from a first power supply 26 so as to provide independent operation of the second stage 53 from the first stage 51.

A layer 52 of a transparent electrical insulating material is interposed between the electrodes 22 and 54 of the first and second stages 51 and 53 to isolate the electric potentials of the first and second stages 51 and 53.

In operation, when the power supply 26 is switched to provide an electric field of a first polarity across the first and second electrodes 14 and 22, an input image 32 incident on the first substrate 12 will cause the photoconductive material layer 16 to conduct, resulting in selective coloration and forming of the image in the electrochromic iridium oxide layer 18 in the first stage 51. Light from a suitable field or plane type light source 76 is then projected onto the first substrate 12 to project the image formed in the first electrochromic iridium oxide layer 18 through the insulating layer 52 to the second stage 53. The second stage 53 with an electric field of a first polarity supplied by the power supply 70 across the electrodes 54 and 66 will operate in the same manner as the reflective cell 40 and causes the projected image to be formed in the electrochromic material layer 62. Due to the electrically insulating layer 52 interposed between the first and second stages 51 and 53, respectively, the electric field applied across the first and second electrodes 14 and 22, respectively, can be removed; while the image formed on the first electrochromic material layer 18, which may be the result of a short duration incident image, remains intact. The image in the second electrochromic material layer 62 can be viewed or additional imaging processing, such as contrast or density variation, etc., may be applied to enhance the stored image.

The image stored on the second electrochromic layer 62 in the second stage 53 may be viewed by the passing light 78 from a second light source spaced from the second electrode 66 through the second electrochromic layer 62 and off of the reflective surface 58. In this way, viewing of the image on the second electrochromic layer 62 is completely independent from the recording and/or erasing of the image on the first electrochromic iridium oxide layer 18.

In summary, a unique electrochromic imaging apparatus utilizing electrochromic iridium oxide and a thin-film, solid ionic conductor has been disclosed which provides fast switching times and long term image memory. Furthermore, due to the completely solid state arrangement of the electrochromic imaging apparatus of the present invention, corrosion and deterioration of the electrochromic material layer is prevented thereby providing long term, reliable use of the electrochromic imaging apparatus.

What is claimed is:

1. An electrochromic imaging apparatus comprising:
   a substrate formed of an optically transparent material;
   a first electrode formed of an optically transparent material having an electrically conductive surface, the first electrode contacting the substrate;
   a layer of a photoconductive material contacting the electrically conductive surface of the first electrode;
   a layer of electrochromic iridium oxide contacting the photoconductive material layer;
   a layer of a solid ionic conductive material contacting the electrochromic iridium oxide layer;
   a second electrode formed of an optically transparent material having an electrically conductive surface, the electrically conductive surface of the second electrode contacting the ionic conductive material layer; and
   means for selectively applying an electric field of opposite polarities across the first and second electrodes.

2. The electrochromic imaging apparatus of claim 1 wherein the photoconductive material is selenium.

3. The electrochromic imaging apparatus of claim 1 wherein the photoconductive material is arsenic triselenide.

4. The electrochromic imaging apparatus of claim 1 wherein the photoconductive material is cadmium sulfide.

5. The electrochromic imaging apparatus of claim 1 further including:
   a layer of a light blocking, electric charge permeable material interposed between the photoconductive material layer and the electrochromic iridium oxide layer in contact with the photoconductive material layer;
   the light blocking, electric charge permeable material layer having opposed surfaces, one of which is optically reflective, the optically reflective surface contacting the electrochromic iridium oxide material layer.

6. The electrochromic imaging apparatus of claim 5 wherein the reflective surface comprises a thin layer of an optically reflective material applied to one surface of the light blocking, electric charge permeable material layer.

7. The electrichromic imaging apparatus of claim 6 wherein the light blocking, electric charge permeable material is cadmium telluride.

8. An electrochromic imaging apparatus comprising:
   a substrate formed of an optically transparent material;
   a first electrode formed of an optically transparent material having an electrically conductive surface, the first electrode contacting the substrate;
   a first layer of a photoconductive material contacting the electrically conductive surface of the first electrode;
   a layer of electrochromic iridium oxide contacting the photoconductive material layer;
   a layer of a solid ionic conductive material contacting the electrochromic iridium oxide;
   a second electrode formed of an optically transparent material having electrically conductive surface, the electrically conductive surface of the second electrode contacting the ionic conductive material layer;
   first means for applying an electric field of opposite polarities across the first and second electrodes whereby an input image incident on said substrate is formed in the electrochromic iridium oxide material layer;
   a layer of electrically insulating, optically transparent material contacting the second electrode;
   a third electrode formed of an optically transparent material having an electrically conductive surface, the third electrode contacting the electrically insulating material;
   a second layer of a photoconductive material contacting the electrically conductive surface of the thrid electrode;
   a layer of a light blocking, electric charge permeable material contacting the second layer of photoconductive material;
   a layer of an optically reflective material contacting the light blocking material layer;
   a second electrochromic material layer contacting the optically reflective material layer;
   a second layer of a solid ionic conductive material contacting the second electrochromic material layer;
   a fourth electrode formed of an optically transparent material having an electrically conductive surface, the electrically conductive surface of the fourth electrode contacting the second layer of ionic conductive material;
   second means for applying an electric field of opposite polarities across the thrid and fourth electrodes; and light source means incident upon the first substrate for projecting the image formed in the first electrochromic iridium oxide layer through the electrically insulating material layer such that the image is formed in the second electrochromic material layer.

9. The electrochromic imaging apparatus of claim 8 wherein the second electrochromic material layer is iridium oxide.

10. The electrochromic imaging apparatus of claim 8 wherein the light blocking material is cadmium telluride.

11. The electrochromic imaging apparatus of claim 8 wherein the light blocking material is selenium.

* * * * *